(12) United States Patent
Shukla

(10) Patent No.: US 9,475,889 B2
(45) Date of Patent: Oct. 25, 2016

(54) PHOTOINITIATOR AND PHOTOCURABLE COMPOSITIONS AND USES

(71) Applicant: Deepak Shukla, Webster, NY (US)

(72) Inventor: Deepak Shukla, Webster, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

(21) Appl. No.: 14/591,199

(22) Filed: Jan. 7, 2015

(65) Prior Publication Data

US 2015/0126637 A1 May 7, 2015

Related U.S. Application Data

(63) Continuation-in-part of application No. 13/108,246, filed on May 16, 2011.

(51) Int. Cl.
*C08F 2/50* (2006.01)

(52) U.S. Cl.
CPC .................................. *C08F 2/50* (2013.01)

(58) Field of Classification Search
CPC ........................................................ C08F 2/50
See application file for complete search history.

(56) References Cited

U.S. PATENT DOCUMENTS

| | | |
|---|---|---|
| RE27,922 E | 2/1974 | Heseltine et al. |
| RE27,925 E | 2/1974 | Jenkins et al. |
| 4,743,528 A | 5/1988 | Farid et al. |
| 4,743,529 A | 5/1988 | Farid et al. |
| 4,743,530 A | 5/1988 | Farid et al. |
| 4,743,531 A | 5/1988 | Farid et al. |
| 4,859,572 A | 8/1989 | Farid et al. |
| 4,940,645 A * | 7/1990 | Davis ...................... G03F 7/002 430/138 |
| 5,091,280 A * | 2/1992 | Yamaguchi ............. G03F 7/002 430/138 |
| 6,022,664 A * | 2/2000 | Washizu ................ B41M 5/287 430/138 |
| 7,632,879 B2 | 12/2009 | Majumdar et al. |
| 8,399,533 B2 | 3/2013 | Shukla |
| 8,632,858 B2 | 1/2014 | Shukla |
| 8,664,287 B2 | 3/2014 | Shukla |
| 8,816,211 B2 | 8/2014 | Shukla |
| 2012/0121815 A1 | 5/2012 | Shukla |
| 2012/0122664 A1 | 5/2012 | Shukla et al. |
| 2012/0123010 A1 | 5/2012 | Shukla |
| 2012/0207935 A1 | 8/2012 | Shukla |
| 2012/0207945 A1 | 8/2012 | Shukla |
| 2012/0208914 A1 | 8/2012 | Shukla |

FOREIGN PATENT DOCUMENTS

| | | |
|---|---|---|
| EP | 0 223 587 B1 | 2/1991 |
| GB | 2 083 832 | 3/1982 |

OTHER PUBLICATIONS

David F. Eaton, "Dye Sensitized Photopolymerization," Advanced in Photochemistry, vol. 13, pp. 427-488 (1986).

* cited by examiner

*Primary Examiner* — Sanza McClendon
(74) *Attorney, Agent, or Firm* — J. Lanny Tucker

(57) ABSTRACT

The photocuring efficiency of an N-oxyazinium salt photoinitiator is increased by mixing it with an organic phosphine as a photoinitiator efficiency amplifier, and with an aryl aldehyde or alkyl aldehyde having a molecular weight of less than 1000. This mixture or photoinitiator composition can be used to cure acrylates or other photocurable compounds, particularly in an oxygen-containing environment.

20 Claims, No Drawings

PHOTOINITIATOR AND PHOTOCURABLE COMPOSITIONS AND USES

CROSS-REFERENCE TO RELATED APPLICATIONS

This application is a continuation-in-part of prior U.S. patent application Ser. No. 13/108,246 filed May 16, 2011 by Shukla (now abandoned), published as 2012/0295999, the disclosure of which is hereby incorporated herein by reference in its entirety.

FIELD OF THE INVENTION

This invention relates to photoinitiator compositions that can be used to cure acrylate-containing photopolymerizable compositions using actinic radiation. In particular, the photoinitiator composition includes an N-oxyazinium salt photoinitiator and an organic phosphine, and can be used in photocurable compositions that are curable in the presence of oxygen to prepare cured compositions, coatings, and articles.

BACKGROUND OF THE INVENTION

Natural and synthetic polymers have served essential needs in society. However, in recent times synthetic polymers have played an increasingly greater role, particularly since the beginning of the 20th century. Such synthetic polymers are commonly prepared by an addition polymerization mechanism, that is, free radical chain polymerization of unsaturated monomers. The majority of commercially significant processes are based on free-radical chemistry, or chain polymerization that is initiated by a reactive species, which often is a free radical. The source of the free radicals is termed an initiator or photoinitiator.

Photochemically induced polymerization reactions have become of great importance in industry, in particular for rapid curing of thin films, such as, for example, in the curing of paint coatings and plastic coatings on paper, wood, metal, and plastic or in the drying of printing inks. This curing by irradiation in the presence of photoinitiators is distinguished, compared with conventional methods for the drying or curing of coatings, by saving of materials and energy, low thermal stress of the substrate, and in particular a high curing rate. Moreover, the preparation of polymer materials by polymerization of the corresponding unsaturated monomeric starting materials is often carried out photochemically and by means of photoinitiators in such conventional processes as solution and emulsion polymerization. Since in the reactions mentioned, none of the reactants is usually capable of absorbing a sufficient amount of the photochemically active radiation, it is necessary to add photoinitiators.

Improvements in free radical chain polymerization have been focused both on the polymer being produced and the photoinitiator. Whether a particular unsaturated monomer can be converted to a polymer requires structural, thermodynamic, and kinetic feasibility. Even when all three properties are present, kinetic feasibility is achieved in many cases only with a specific type of photoinitiator. Moreover, the photoinitiator can have a significant effect on reaction rate, which, in turn, can determine the commercial success or failure of a particular polymerization process or product.

The primary function of a photoinitiator is to generate free radicals when the photoinitiator is irradiated with light of appropriate energy or wavelength. Photoinitiators are classified into "Type I" (or photocleavage) photoinitiators and "Type II" (or H-abstraction) photoinitiators according to the pathways by which the effective initiating radicals are generated.

In contrast to photocleavage photoinitiators that are decomposed by light directly into radicals that are effective in initiating polymerization, Type II photoinitiators require a hydrogen donor, or more generally a source of abstractable hydrogen's in order to generate radicals that are effective in initiating polymerization. The process of H-abstraction is usually a bimolecular reaction requiring the encounter of a photoinitiator and a hydrogen-donor. Any source of abstractable hydrogen's can be useful (for example, any structure that yields a stable radical after H-abstraction can serve as an "H donor") and such sources include amines, thiols, unsaturated rubbers such as polybutadiene or polyisoprene, and alcohols.

Type I photoinitiators can generate free radical either of the two following mechanisms:

(1) the photoinitiator undergoes excitation by energy absorption with subsequent decomposition into one or more radicals, or (2) a sensitizer molecule absorbs light and the excited sensitizer then transfers energy to the photoinitiator to generate free radicals.

The basic photochemistry and photophysics of both Type I and Type II photoinitiators have been well studied and utilized industrially in UV curable systems (see for example, Turro, N. J., Modern Molecular Photochemistry, 1991, University Science Books, chapters 7, 10, and 13.).

A number of Type I photoinitiators are commonly used in a variety of photocuring related applications and are commercially available. Among Type I photoinitiators, the hydroxyalkylphenone photoinitiators have proven to be particularly useful. Such photoinitiators include but are not limited to, benzoin ethers, benzil monoketals, dialkoxyacetophenones, hydroxyalkylphenones, and derivatives derived from these classes of compounds. α-Amino arylketones are also commonly used as Type I photoinitiators and are commercially available as are mono- and bis-acylphosphine oxides.

Most known photoinitiators (both Type I and II) have only moderate quantum yields (generally less than 0.5), indicating that the conversion of light radiation to radical formation needs to be made more efficient. The overall efficiency of photocuring process, in addition to overall composition of polymerizable material(s), depends on the quantum yield of radical generation of photoinitiator. To increase the overall efficiency of a photocuring, improvements in photoinitiators, as well as improvements in photoinitiating compositions, are necessary. In some cases, the commercial viability of certain systems can depend on whether a relatively modest improvement, for example, in the 2 to 10 times range, can be achieved. Improving photocuring efficiency is especially critical since with increasing diversification and specialization of processes and products in the area of coating techniques using polymer materials and, more and more frequent requirement of providing tailor-made solutions for these problems, increasingly requires higher and more specific demands on the photoinitiators and photoinitiating compositions. Therefore, in many cases, known photoinitiators do not fulfill, or at least not to an optimum degree, the demand made on them today. In most practical applications major, problems include the need to achieve even maximum (or theoretical) photoinitiator efficiency. These problems arise, for example:

(a) due to inefficient light absorption in pigmented systems, (b) lack of compatibility with a wide range of binder systems and their reactive components and other modifying additives, or (c) the storage instability in the dark of the systems containing the photoinitiator and the possible deterioration in the quality of the cured final product, such as yellowing, as a result of unconverted initiator residues and initiator degradation products.

Besides these challenges, there is an additional challenge of free radical photocuring inhibition by the presence of oxygen. Oxygen inhibition has always been a major problem for photocuring of acrylate-containing compositions containing multifunctional acrylate monomers or oligomers using a photoinitiated radical polymerization (for example, see Decker et al., *Macromolecules* 18 (1985) 1241.). Oxygen inhibition is due to the rapid reaction of carbon centered propagating radicals with oxygen molecules to yield peroxyl radicals. These peroxyl radicals are not as reactive towards carbon-carbon unsaturated double bonds and therefore do not initiate or participate in any photopolymerization reaction. Oxygen inhibition usually leads to premature chain termination, resulting in incomplete photocuring. Thus, many photocuring processes must be carried out in inert environments (for example, under nitrogen or argon), making such processes more expensive and difficult to use in industrial and laboratory settings.

Various methods have been proposed to overcome oxygen inhibition of photocuring:

(1) Amines that can undergo a rapid peroxidation reaction can be added to consume the dissolved oxygen. However, the presence of amines in acrylate-containing compositions can cause yellowing in the resulting photocured composition, create undesirable odors, and soften the cured composition because of chain transfer reactions. Moreover, the hydroperoxides thus formed will have a detrimental effect on the weathering resistance of the UV-cured composition.

(2) Dissolved oxygen can be converted into its excited singlet state by means of a red light irradiation in the presence of a dye sensitizer. The resulting $^1O_2$ radical will be rapidly scavenged by a 1,3-diphenylisobenzofuran molecule to generate a compound (1,2-dibenzoylbenzene) that can work as a photoinitiator (Decker, *Makromol. Chem.* 180 (1979), p. 2027). However, the photocured composition can become colored, in spite of the photobleaching of the dye, prohibiting this technique for use in various products.

(3) The photoinitiator concentration can be increased to shorten the UV exposure during which atmospheric oxygen diffuses into the cured composition. This technique can also be used in combination with higher radiation intensities. Oxygen inhibition can further be reduced by using high intensity flashes that generate large concentrations of initiator radicals reacting with oxygen, but hydroperoxides are also formed.

(4) Free radical photopolymerization can be carried out under inert conditions (Wight, *J. Polym. Sci.: Polym. Lett. Ed.* 16 (1978) 121), which is the most efficient way to overcome oxygen inhibition. Nitrogen is typically continuously used to flush the photopolymerizable composition during UV exposure. On an industrial UV-curing line, which cannot be made completely airtight, nitrogen losses can be significant, thus making the process expensive and inefficient. This is an even greater concern if argon is used to provide an inert environment.

Other less common ways of overcoming oxygen inhibition of acrylate photopolymerization include using a wax barrier and performing UV exposure under water. Each of these techniques has disadvantages that have made them less likely for commercial application.

Copending and commonly assigned U.S. Ser. Nos. 13/026,355, 13/026,360, 13/026,365, 13/026,372, and 13/026,380 (all filed Feb. 14, 2011 by Shukla) describe photoinitiator and photocurable compositions and their use to form photocured articles and inks in oxygen-containing environments. These compositions include an organic phosphine and optionally an aldehyde.

In addition, copending and commonly assigned U.S. Ser. No. 12/945,994 (filed Nov. 15, 2010 by Shukla), Ser. No. 12/946,068 (filed Nov. 15, 2010 by Shukla, Meyer, and Ahern), and Ser. No. 12/946,074 (filed Nov. 15, 2010 by Shukla) describe the use of N-oxyazinium salt photoinitiators in photoinitiator and photocurable compositions.

Moreover, there is a need in the art for additional new, energy-efficient photoinitiator compositions that can be used for use in a variety of polymerization and photocuring processes in the presence of oxygen. The need for highly efficient photoinitiating compositions is particularly acute where absorption of light by the reaction medium can limit the amount of energy available for absorption by the photoinitiators. For example, in the preparation of color filter resists, highly pigmented resists are required for high color quality. With the increase in pigment content, the curing of color resists becomes more difficult. The same is true for the UV-photocurable inks, for example offset printing inks, which also are loaded with pigments. Hence, there is a need for photoinitiating compositions having high sensitivity and excellent resolution properties. In addition, there is a need for such photoinitiating compositions to meet the industrial properties such as high solubility, thermal stability, and storage stability.

SUMMARY OF THE INVENTION

The present invention provides a photoinitiator composition comprising at least one N-oxyazinium salt photoinitiator, an aryl aldehyde or alkyl aldehyde each having one or more aldehyde moieties and a molecular weight of less than 1000, and at least one organic phosphine as an N-oxyazinium salt efficiency amplifier.

This invention also provides a photocurable composition comprising at least one N-oxyazinium salt photoinitiator, an aryl aldehyde or alkyl aldehyde each having one or more aldehyde moieties and a molecular weight of less than 1000, at least one organic phosphine as an N-oxyazinium salt efficiency amplifier, and at least one photocurable compound.

The present invention addresses some of the difficulties and problems that are discussed above with energy-efficient photoinitiator compositions that can be used in photocurable compositions and in methods of photocuring in various industrial applications. One of the primary advantages of the present invention is that when the photoinitiator composition is combined with polymerizable or photocurable materials, it enables more rapid curing times. Moreover, such rapid curing can be achieved in air or in the presence of oxygen as well as in inert environments. Rapid curing in air is particularly advantageous since, as described above, oxygen usually inhibits curing.

The photoinitiator compositions of this invention can be used to generate free radical species upon irradiation, for example under extremely low energy lamps, such as excimer lamps and mercury lamps, as compared to known photoinitiators alone. Further, the photoinitiator compositions of the present invention can be as much as 200 times faster that the best prior art photoinitiators.

As noted, when combined with a polymerizable or photocurable compound such as an acrylate, the photoinitiator composition causes rapid curing times in comparison to the curing times carried out using the photoinitiator alone or photoinitiator with phosphine. It was surprising that the use of the organic phosphine with an aryl aldehyde or an alkyl aldehyde in the photoinitiator and photocurable compositions of this invention provided unexpectedly better performance in photocuring even in the presence of oxygen.

These and other features and advantages of the present invention will become apparent after a review of the following detailed description of the disclosed embodiments and the appended claims.

DETAILED DESCRIPTION OF THE INVENTION

The photoinitiator compositions of the present invention comprise at least one wavelength-specific N-oxyazinium salt photoinitiator, at least one organic phosphine compound, and optionally at least one photo sensitizer. The photoinitiator compositions need no other components that are essential to photoinitiation or the creation of free radicals. As noted below, the compositions can optionally include photosensitizers that adjust or sharpen the spectral sensitivity of the N-oxyazinium salt photoinitiator to photocuring radiation. Thus, addenda can be present that are not needed for free radical generation but that relate to functions other than photoinitiating. A skilled worker would understand that with routine experimentation, the combination of N-oxyazinium salt photoinitiator, organic phosphine, an aryl aldehyde or an alkyl aldehyde, and optional photosensitizer can be varied in type and amount of the compounds to optimize the efficacy of the photoinitiator composition with a given photocurable compound.

The present invention is useful in methods of polymerizing or photocuring a photocurable compound. For example, the photoinitiator compositions can be used in a method of photocuring or polymerizing one or more ethylenically unsaturated polymerizable monomers, oligomers, or crosslinkable polymers by exposing the photocurable compounds to suitable radiation in the presence of the photoinitiator compositions.

The photoinitiator compositions of this invention can be used to form films or coatings, for example by providing a mixture of one or more photocurable compounds and a photoinitiator composition of the present invention as a photocurable composition in a film or a coating and irradiating the film or coating with a suitable amount of radiation sufficient to cure or polymerize the film or coating. The photocurable composition can be drawn into a film on a nonwoven web or into fibers, thereby providing coated nonwoven web or fibers.

Alternatively, the photoinitiator composition or photocurable composition can be applied in a suitable manner to a substrate prior to curing by irradiation. Still again, a photocurable composition can be irradiating during the application to a substrate.

The photocurable compositions can also be used to form adhesive compositions comprising a photocurable compound mixed with a photoinitiator composition of the present invention. Similarly, the present invention can be used to form laminated structures comprising at least two layers bonded together with an adhesive composition, in which at least one layer is a nonwoven web or film. Accordingly, the present invention provides a way for laminating a structure having at least two layers with the adhesive composition between the layers by irradiating the adhesive composition to effect curing.

Because the photocuring speeds are high using the present invention, the photoinitiator composition can be used to advantage with photocurable compositions that are dyed or pigmented or with compositions into which light penetration is limited, such as inks. In addition, the compositions of the present invention can be used in high speed curing processes (for example, roll-to-roll manufacturing processes). It is also possible to use the present invention to rapidly and partially or completely cure a photocurable composition to modify its viscosities.

DEFINITIONS

Unless otherwise indicated, the term "photoinitiator composition" used in this application will refer to embodiments of the present invention.

The terms "curing," "photocuring," and "polymerizing" are used herein to mean the combining for example, by covalent bonding, of large number of smaller molecules, such as monomers or oligomers, to form very large molecules, that is, macromolecules or polymers, when irradiated with radiation such as ultraviolet (UV), visible, or infrared radiation. The monomers can be combined to form only linear macromolecules or they can be combined to form three-dimensional macromolecule, commonly referred to as crosslinked polymers. Thus, these terms include polymerization of functional oligomers and monomers, or even crosslinkable polymers, into a crosslinked polymer network.

The terms "unsaturated monomer," "functional oligomer," and "crosslinking agent" are used herein with their usual meanings and are well understood by those having ordinary skill in the art.

The singular form of each component of the photoinitiator composition and photocurable composition is intended also to include the plural that is, one or more of the respective components.

The term "ethylenically unsaturated polymerizable material" is meant to include any unsaturated material having one or more carbon-to-carbon double bonds (ethylenically unsaturated groups) capable of undergoing polymerization. The term encompasses ethylenically unsaturated polymerizable monomers, oligomers, and crosslinkable polymers. The singular form of the term is intended to include the plural. Monofunctional monomers, oligomers, and multifunctional acrylates are examples of unsaturated polymerizable compounds.

As used herein, the term "quantum yield" is used herein to indicate the efficiency of a photochemical process. More particularly, quantum yield is a measure of the probability that a particular molecule will absorb a quantum of light during its interaction with a photon. The term expresses the number of photochemical events per photon absorbed. Thus, quantum yields can vary from zero (no absorption) to 1.

The term "photosensitizer" is meant to refer to a light absorbing compound used to enhance the reaction of an N-oxyazinium salt photoinitiator. Upon photoexcitation, a photosensitizer leads to energy or electron transfer to a photoinitiator.

"Actinic radiation" is any electromagnetic radiation that is capable of producing photochemical action and can have a wavelength of at least 150 nm and up to and including 1250 nm, and typically at least 300 nm and up to and including 750 nm.

Photoinitiator Compositions

In their most simple form, the energy-efficient photoinitiator compositions of the present invention comprise:

(a) at least one radiation-sensitive N-oxyazinium salt photoinitiator that absorbs actinic radiation and therefore produces free radicals, (b) at least one organic phosphine, (c) at least one alkyl aldehyde or aryl aldehyde, and (c) optionally, at least one photosensitizer.

Any organic phosphine is useful in the practice of this invention but particularly useful organic phosphines are represented by the following Structure (I) or (II):

wherein the multiple R' groups are:

(1) hydrogen, (2) the same or different substituted or unsubstituted alkyl groups, (3) the same or different substituted or unsubstituted cycloalkyl groups, (4) the same or different substituted or unsubstituted aryl groups, (5) the same or different HO[{CH(R)}$_x$]$_y$ groups wherein the multiple R groups are the same or different and can be hydrogen atoms or substituted or unsubstituted alkyl or cycloalkyl groups, or two R' groups together can form a cyclic aliphatic ring or fused ring system, x is an integer of at least 2 and up to and including 20, and y is an integer of at least 1 and up to and including 20, or (6) two adjacent R' groups are joined together to form a cyclic ring with the phosphorus atom, provided at least one R' group is not hydrogen, and L is a connecting group having at least 1 to 12 carbon atoms, and optionally one or more nitrogen, oxygen, or sulfur atoms, in the linking chain. For example, the L group can be a substituted or unsubstituted alkylene group having 1 to 6 carbon atoms, or typically 1 to 4 carbon atoms, in the linking chain.

In most embodiments, two or three of the R' groups are not hydrogen.

For example, the multiple R' groups can be the same or different substituted or unsubstituted alkyl groups having 1 to 10 carbon atoms, substituted or unsubstituted cycloalkyl groups having 5 or 6 carbon atoms in the ring, or substituted or unsubstituted HO[{CH(R)}$_x$]$_y$ groups wherein the multiple R groups are the same or different and can be hydrogen atoms or substituted or unsubstituted alkyl or cycloalkyl groups, x is an integer of at least 2 and up to and including 10, and y is an integer of at least 1 and up to and including 10.

For example, the photoinitiator composition can comprise one or more of methyl phosphine, dimethyl phosphine, trimethyl phosphine, triethyl phosphine, tripropyl phosphine, tri-n-butyl phosphine, triisobutyl phosphine, triamyl phosphine, trihexyl phosphine, trinonyl phosphine, tri-(ethylene glycol)phosphine, tri-(propylene glycol)phosphine, tri(isopropylene glycol)phosphine, tri(butylene glycol)phosphine, tri(isobutylene glycol)phosphine, tri(pentylene glycol)phosphine, tri(hexylene glycol)phosphine, tri(nonylene glycol)phosphine, tri(diethylene glycol)phosphine, tri(triethylene glycol)phosphine, tri(polyethylene glycol)phosphine, tri(polypropylene glycol)phosphine, di(ethylamino) phenylphosphine, triphenyiphosphine, tritoylphosphine, tris(4-methoxyphenyl)phosphine, tri(polybutylene glycol) phosphine, bis(diphenylphosphinoethyl)phenylphosphine, bis(diphenylphosphino)methane, 1,2-bis(diphenylphosphino)ethane, 1,5-bis(dicyclohexylphosphino)pentane, 1,4-bis(dicyclohexylphosphino)butane, 1,2-bis(dicyclohexylphosphino)ethane, bis(dicyclohexylphosphino)methane, bis(diphenylphosphino)methane monoxide, and the compound represented by the following structure:

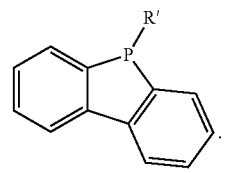

Examples of some useful tertiary organic phosphines and methods for making them are described in U.S. Pat. No. 7,250,535 (Maehara et al.) that is incorporated herein by reference. Examples of some useful secondary organic phosphines and methods for making them are described in EP 1,864,990A1 (Kasak et al.) that is also incorporated herein by reference.

In some embodiments, the photoinitiator composition includes two or more different organic phosphines.

The useful N-oxyazinium salt photoinitiators that generates radicals either upon direct absorption of actinic radiation or by energy transfer from photosensitizers (described below). The N-oxyazinium salt photoinitiators are N-oxy-N-heterocyclic compounds having a heterocyclic nucleus, such as a pyridinium, diazinium, or triazinium nucleus. The N-oxyazinium salt can include one or more aromatic rings, typically carbocyclic aromatic rings, fused with the N-oxy-N-heterocyclic compound, including quinolinium, isoquinolinium, benzodiazinium, phenanthridium, and naphthodiazinium. Any convenient charge balancing counter-ion can be employed to complete the N-oxyazinium salt photoinitiators, such as halide, fluoroborate, hexafluoro-phosphate, and toluene sulfonate. The oxy group (—O—R$_1$) of the N-oxyazinium compound that quaternizes the ring nitrogen atom of the azinium nucleus can be selected from among a variety of synthetically convenient oxy groups. The N-oxyazinium salt photoinitiators can also be oligomeric or polymeric compounds.

The N-oxyazinium salt photoinitiator can have a reduction potential less negative than −1.4 V and comprise an N-oxy group that is capable of releasing an oxy radical during irradiation of the photocurable composition.

Representative N-oxyazinium salts can be represented by the following Structure (III):

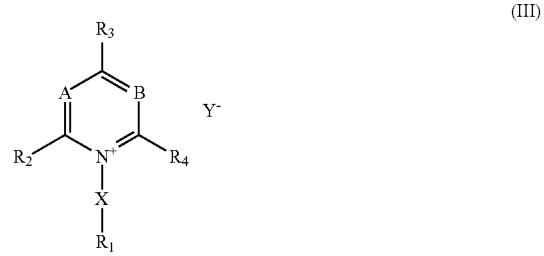

wherein A and B in Structure (III) independently represent a carbon, C—R$_5$, C—R$_6$, or nitrogen. X is oxygen (O).

R$_1$, R$_2$, R$_3$, R$_4$, R$_5$, and R$_6$ are independently hydrogen, or substituted or unsubstituted alkyl groups having 1 to 12 carbon atoms or substituted or unsubstituted aryl groups having 6 or 10 carbon atoms in the carbocyclic ring, which groups can be substituted with one or more acyloxy, alkoxy, acyloxy, alkylthio, arylthio, alkylsulfonyl, thiocyano, cyano, halogen, alkoxycarbonyl, aryloxycarbonyl, acetal, aroyl, alkylaminocarbonyl, arylaminocarbonyl, alkylaminocarbonyloxy, arylaminocarbonyloxy, acylamino, amino, alkylamino, arylamino, carboxy, sulfo, trihalomethyl, alkyl, aryl, heteroaryl, alkylureido, arylureido, succinimido, phthalimido groups, —CO—R$_7$ wherein R$_7$ is a substituted or unsubstituted alkyl or a substituted or unsubstituted aryl group, or —(CH=CH)$_m$—R$_8$ wherein R$_8$ is a substituted or unsubstituted aryl group or a substituted or unsubstituted heterocyclic group.

Any of the A, B, and R groups where chemically feasible can be joined together to form a ring. Y$^-$ is a suitable charge balancing anion that can be a separate charged moiety or a charged part of an A, B, or R group.

Other useful N-oxyazinium salts are represented by the following Structure (IV):

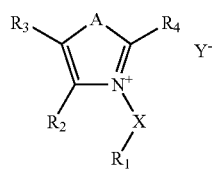

(IV)

wherein A in Structure (IV) represents carbon, C—R$_5$, nitrogen, sulfur, or oxygen with sufficient bonds and substituents to form a heteroaromatic ring. X is oxygen (O). R$_1$, R$_2$, R$_3$, R$_4$, and R$_5$ are independently hydrogen, or substituted or unsubstituted alkyl or aryl groups as described above for Structure (III), or any two R groups can be joined together to form a ring. Y$^-$ is a charge balancing anion that can be a separate charged moiety or part of a charged R group.

In some embodiments of Structures (III) and (IV), R$_1$ is a substituted or unsubstituted alkyl group having 1 to 18 carbon atoms or a substituted or unsubstituted aryl group having 6 or 10 carbon atoms in the aromatic ring.

Other useful N-oxyazinium salt photoinitiators having a cation can be represented by the following formulae:

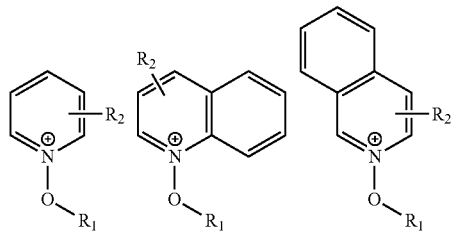

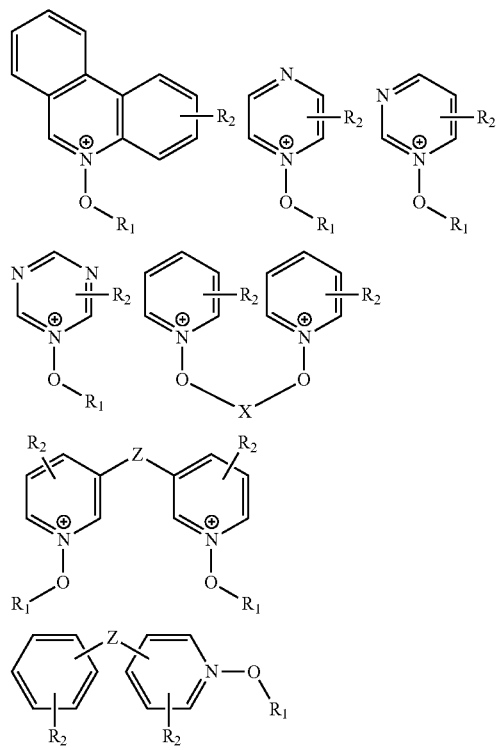

wherein R$_1$ represents a substituted or unsubstituted alkyl group, substituted or unsubstituted aryl group, or an acyl group, as described above, and wherein R$_1$ can also include a charge balancing anion, the R$_2$ groups independently represent hydrogen, or substituted or unsubstituted alkyl, substituted or unsubstituted aryl, substituted or unsubstituted alkoxy, or substituted or unsubstituted heteroaryl groups. The R$_2$ groups can also be nitrile groups. X is a divalent linking group and Z is a substituted or unsubstituted aliphatic linking group having 1 to 12 atoms in the linking chain.

Other useful N-oxyazinium salt photoinitiators are illustrated by Structures III and IV and the compounds shown in TABLES 1 and 2 of U.S. Pat. No. 7,632,879 (Majumdar et al.) the disclosure of which is incorporated herein by reference for this teaching of the compounds.

Particularly useful N-oxyazinium salt photoinitiators are compounds OZ-1 to OZ-16 identified below in TABLE I.

TABLE I

OZ-1

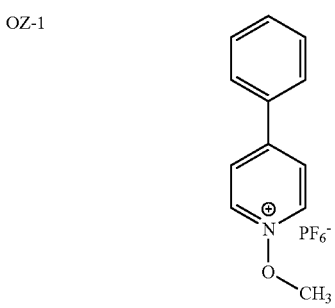

TABLE I-continued
OZ-2 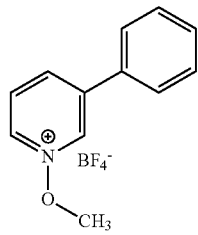
OZ-3 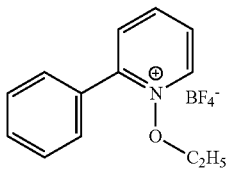
OZ-4 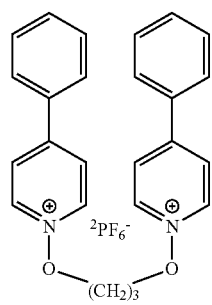
OZ-5 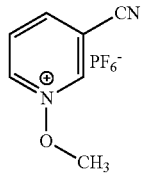
OZ-6 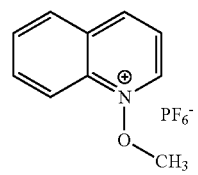
OZ-7 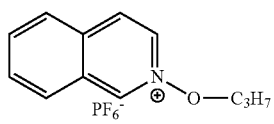
OZ-8 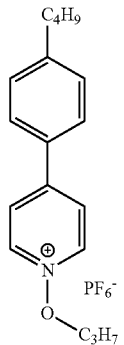
OZ-9 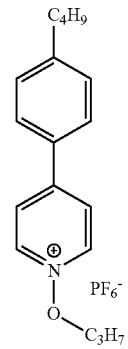
OZ-10 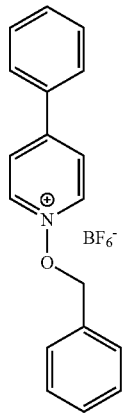
OZ-11 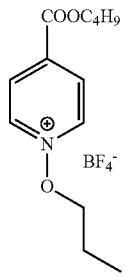
OZ-12 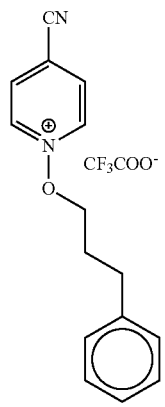

TABLE I-continued

OZ-13
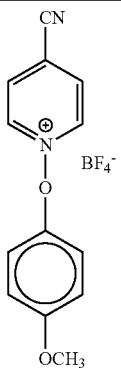

OZ-14
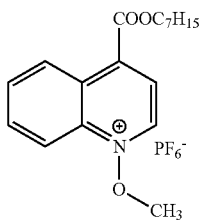

OZ-15
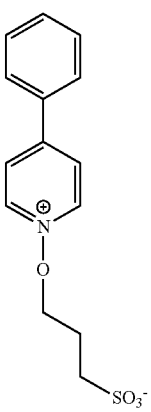

OZ-16
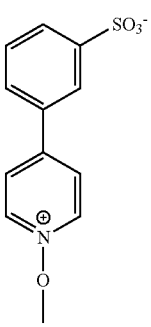

Mixtures of N-oxyazinium salt photoinitiators can be used if desired, and the total amount of N-oxyazinium salt photoinitiators in the photoinitiator and photocurable compositions of this invention is generally at least 1 weight %, or typically at least 2 weight % and up to and including 50 or up to and including 20 weight % based on the total composition solids (for example the total of N-oxyazinium salt photoinitiator, photosensitizer for the N-oxyazinium salt photoinitiator, and organic phosphine N-oxyazinium salt efficiency amplifier).

The total amount of N-oxyazinium salt photoinitiators in the photoinitiator and photocurable compositions is generally at least 2 weight %, or typically at least 60 weight % and up to and including 90 weight %, based on the total composition solids. The weight ratio of organic phosphine to N-oxyazinium salt photoinitiator in the photoinitiator composition is at least 0.01:1 and up to and including 100:1, or typically of at least 0.5:1 and up to and including 50:1.

The aldehydes useful in the photocurable inks include any compounds having one or more aldehyde (—CHO) moieties. It would be readily apparent to one skilled in the art that the chosen aldehyde should not interfere with curing radiation, with radiation absorption by the photoinitiator, and the basic chemistry of the photoinitiator. Thus, the useful aldehydes do not appreciably absorb the same radiation absorbed by the photosensitizers present in the composition. For example, the useful aldehydes are alkyl aldehydes and aryl aldehydes having one or more aldehyde moieties. For example, useful aldehydes include R"—CHO compounds in which R" is an alkyl or aryl group that is unsubstituted or substituted with one or more groups that do not adversely affect the behavior of the aldehyde moieties. For example, aryl aldehydes can be substituted or unsubstituted benzaldehydes and naphthaldehydes including but not limited to, 4-methoxybenzaldehyde, 4-methylbenzaldehyde, terephthaldehyde, 2,5-dimethoxy-1,4-benzenedicarboxaldehyde, and naphthalene-1,4-dicarboxaldehyde. Useful alkyl aldehydes include but are not limited to compounds with substituted or unsubstituted alkyl groups having 1 to 20 carbon atoms in the alkyl group. As used herein, "alkyl group" also include substituted or unsubstituted cycloalkyl groups having 5 to 10 carbon atoms in the ring. Examples of useful alkyl aldehydes include but are not limited to, acetaldehyde, propionaldehyde, butyraldehyde, 2-methylbutyraldehyde, cyclohexanecarboxaldehyde, and cyclopentanecarboxaldehyde.

It is also possible that the "aldehyde" is an oligomeric or polymeric compound having recurring units wherein each unit comprises an aldehyde moiety and is represented for example by —(CH$_2$CH(CHO))—. Thus, in such embodiments, the R" group noted above is an oligomeric or polymeric backbone and the oligomer or polymer has multiple aldehyde moieties along the backbone.

All of the useful aldehydes have a molecular weight of less than 1000. In some embodiments, each of the aldehydes has a single aldehyde moiety and a molecular weight less than 300. In other embodiments, each aldehyde has at one or two aldehyde moieties and a molecular weight less than 1000. Of course, mixtures of such aldehydes can be used if desired.

The amount of aldehyde in the photocurable ink is chosen in relation to the amount of total organic phosphines. For example, the molar ratio of the organic phosphine to the aldehyde moieties in a composition of this invention is at least 1:1 and up to and including 4:1, or typically at least 1:1 and up to and including 3:1, although more or less phosphine can be used if desired. In some embodiments, the organic phosphine is present in a molar excess (greater than 1:1) compared to the aldehyde moieties in the photocurable ink.

In many embodiments, the photoinitiator compositions further comprise a photosensitizer for the photoinitiator. Photosensitizers useful in present invention include any compounds capable of transferring energy from its own lowest excited state after it has absorbed radiation, to the N-oxyazinium salt photoinitiator. The driving force for this process depends upon the triplet energy of photosensitizer, $(E^T)_s$, and the triplet energy of photoinitiator, $(E^T)_p$. Thus, for the energy transfer from photosensitizer to photoinitiator to take place the triplet energy of photosensitizer $(E^T)_s$ should to be greater or equal to the triplet energy of photoinitiator, $(E^T)_P$. Even in cases where the triplet energy of the photosensitizer is slightly lower than that of photoinitiator, energy transfer is feasible.

The amount of photosensitizer used in such embodiments of the photoinitiator compositions of this invention depends largely on its optical density at the wavelength(s) of radiation used to initiate curing. Solubility of the photosensitizer in a photocurable composition can also be a factor. It is possible that the photosensitizer is a covalently bound part of a photocurable compound such as an acrylate. Either a photosensitizer bound in this manner or a non-bound photosensitizer with a low extinction coefficient can be utilized at relatively high levels to help facilitate the transfer of an electron to the N-oxyazinium salt photoinitiator from a triplet photosensitizer ($^3S$). When covalently attached to a polymeric photocurable compound, the photosensitizer can be present in an amount of at least 0.01 weight % and up to and including 10 weight % based on the total weight of the N-oxyazinium salt photoinitiator. An example of such a covalently bound photosensitizer is a benzophenone moiety (that absorbs actinic radiation) that is bound to a photocurable material, or it can be attached to an inert polymeric binder. The amount of the photosensitizers is generally governed by their molar absorptivity or extinction coefficient. Photosensitizers that are not bound to photocurable compounds or polymers can be present in an amount of at least 1 weight % and up to and including 10 weight %, based on the total weight of the N-oxyazinium salt photoinitiator.

The triplet energies of the photosensitizers useful in present invention are known (for example see *Handbook of Photochemistry*, Eds. Steven L. Murov, Ian Carmichael, Gordon L. Hug, 1993, Marcel Dekker, Inc.). Energies for some photosensitizers or closely related analogs are also disclosed in other literature. Methods to experimentally measure triplet energies are also commonly known in the literature [for example see *J. Amer. Chem. Soc.* 102, 2152 (1980) and *J. Phys. Chem.* 78, 196 (1974)].

Some useful photosensitizers absorb visible light or near ultraviolet light, for example at a wavelength of at least 250 nm and up to and including 450 nm. The ketocoumarins disclosed in *Tetrahedron* 38, 1203 (1982) represent one class of such useful photosensitizers. The ketocoumarins described in U.K. Patent Publication 2,083,832 (Specht et al.) are also useful photosensitizers. The ketocoumarins exhibit very triplet state generation efficiencies. Other classes of useful photosensitizers include but are not limited to, benzophenones, xanthones, thioxanthones, arylketones, and polycyclic aromatic hydrocarbons.

Photocurable Compositions

The photoinitiator composition of this invention is useful as part of photocurable compositions of this invention to provide polymerized or crosslinked compositions in various forms including but not limited to, coatings, molded articles, printed patterns, fibers, laminates, inks, and varnishes.

Such photocurable compositions then comprise at least one N-oxyazinium salt photoinitiator (as described above), at least one organic phosphine such as those defined above with Structure (I) or (II), optionally at least one photosensitizer (as described above), and at least one photocurable compound (such as an acrylate) that can be, for example, an ethylenically unsaturated polymerizable compound (or monomer) that has at least one terminal ethylenically unsaturated group and is capable of forming a polymerized material such as a prepolymer or polymer using photoinitiated addition polymerization. As described above, the N-oxyazinium salt photoinitiator is radiation-sensitive and absorbs actinic radiation and produces free radicals.

Such photocurable compounds can be unsaturated monomers and oligomers examples of which include ethylene, propylene, vinyl chloride, isobutylene, styrene, isoprene, acrylonitrile, acrylic acid, methacrylic acid, ethyl acrylate, ethyl methacrylate, methyl acrylate, methyl methacrylate, butyl acrylate, vinyl acrylate, allyl methacrylate, tripropylene glycol diacrylate and other diacrylates and dimethacrylates, various triacrylates and tri-methyl acrylates, trimethylol propane ethoxylate acrylate, epoxy acrylates such as the reaction products of a bisphenol A epoxide with acrylic acid, polyether acrylates such as the reaction products of acrylic acid with an adipic acid/hexanediol-based polyether, urethane acrylates such as the reaction product of hydroxypropyl acrylate with diphenylmethane-4,4'-diisocyanate, and polybutadiene diacrylate oligomers.

In many embodiments, the photocurable compound is a mono- or multi-functional acrylate (also intended to include methacrylates) that is considered herein to be any material of any molecular weight that has at least one ethylenically unsaturated group. Such acrylates can be ethylenically unsaturated polymerizable monomers, oligomers, and crosslinkable polymers. The acrylates can have multiple acrylate groups (for example diacrylates and triacrylates). In other embodiments, the photocurable compounds are resins having a weight average molecular weight of at least 100,000.

Many of these embodiments of photocurable compositions can also includes one or more photosensitizers, as described above, that absorb appropriate actinic radiation and are raised to an active state during photocuring.

The photocurable composition can include one or more non-reactive organic solvents including but not limited to, ethyl methyl ketone, ethyl acetate, chloroform, methylene chloride, acetonitrile, toluene, xylenes, hexane, heptanes, petroleum ether, diethyl ether, and mixtures of two or more of these solvents. The photocurable compound itself can act also as the composition organic solvent and be present as the sole organic solvent or in combination with one or more non-reactive organic solvents. The term "non-reactive" means that the organic solvent does not react with any of the components of the composition.

In addition, the photocurable composition can include other materials as desired, such as pigments, extenders, amine synergists, and such other additives as are well known to those having ordinary skill in the art. Alternatively, these addenda can be added to the photocurable composition during photocuring.

In the photocurable compositions, a photo sensitizer for the N-oxyazinium salt photoinitiator can be present in an amount of at least 0.1 weight % and up to and including 10 weight %, or at least 0.5 weight % and up to and including 5 weight %, or more typically at least 1 weight % and up to and including 2 weight %, of the photocurable composition.

The photoinitiator concentrations in the photocurable compositions can be specified in terms of weight % of N-oxyazinium salt photoinitiator in per gram of photocurable compound (or acrylate). Typical concentrations of N-oxyazinium salt photoinitiator are at least 0.1 weight % and up to and including 20 weight %, or typically at least 0.5 weight % and up to and including 10 weight %, or more typically at least 0.5 weight % and up and including 5 weight % of photocurable composition. The exact amount of N-oxyazinium salt photoinitiator that is used, as is commonly understood by one skilled in the art, depends largely on its molar absorptivity at the wavelength of excitation and the efficiency of radical generation.

In addition, the organic phosphine(s) can be present in the photocurable compositions in an amount of at least 0.5 weight % and up to and including 20 weight %, typically at least 1 weight % and up to and including 10 weight %, or more typically at least 2 weight % and up to and including 10 weight % of the photocurable composition. The use of larger amounts of organic phosphine is also possible.

The photoinitiator compositions and photocurable compositions can be provided in any form that is suitable for the various components or intended use. In most embodiments, the photoinitiator compositions and photocurable compositions are in solid form such as powders, granules, or pressed tablets. In some embodiments, the photoinitiator compositions and photocurable compositions are in liquid form, such as solutions containing organic solvents for solubilizing or dispersing the components. In still other embodiments, the photocurable composition is in liquid form in which the photocurable compound (such as an acrylate) serves as the solubilizing or dispersing solvent.

Photocurable Inks

A photocurable composition of this invention also can be a photocurable ink used in various imaging operations, which photocurable ink comprises a suitable colorant dissolved or dispersed in a solvent such as an organic solvent or polymerizable monomers or oligomers, an N-oxyazinium salt photoinitiator (described above), an organic phosphine (such as those defined by Structure (I) above in the amounts described above), and a photocurable compound (such as an acrylate as described above). For example, the amount of organic phosphine is present in the photocurable ink in an amount of at least 1 and up to and including 20 weight %. The N-oxyazinium salt photoinitiator is present in the photocurable ink in an amount as described above for photocurable compositions.

The colorant for use in the photocurable inks can be selected from any suitable soluble dye or pigment dispersion, or a combination thereof. The colorant can be anionic or cationic. The colorant can be present with or without a dispersing agent, which compounds are known in the art.

When dyes are used in the photocurable inks that can be used as inkjetable inks, any suitable commercially available dye can be used to impart the desired color characteristics to the compositions. Either anionic or cationic dyes are useful, but most useful dyes are anionic. Anionic dyes are those in which a negative charge is localized on one atom or spread over the entire molecule. Cationic dyes are those in which a positive charge is localized on one atom or spread over the entire molecule.

Specific examples of useful anionic dyes include Bernacid Red 2BMN, Pontamine Brilliant Bond Blue A, Pontamine, Food Black 2, Carodirect Turquoise FBL Supra Conc. (Direct Blue 199, Carolina Color and Chemical), Special Fast Turquoise 8GL Liquid (Direct Blue 86, Mobay Chemical), Intrabond Liquid Turquoise GLL (Direct Blue 86, Crompton and Knowles), Cibracron Brilliant Red 38-A (Reactive Red 4, Aldrich Chemical), Drimarene Brilliant Red X-2B (Reactive Red 56, Pylam, Inc.), Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz, Inc.), Carodirect Yellow RL (Direct Yellow 86, Carolina Color and Chemical), Cartasol Yellow GTF Liquid Special 110 (Sandoz, Inc.), D&C Yellow #10 (Acid Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BI, (Nippon Kayaku Company), Levanol Brilliant Red 3BW (Mobay Chemical Company). Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz). Pergasol Yellow COP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Cone A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B (Reactive Red 31), Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and intracron Black RL, all available from Crompton and Knowles, Dyes and Chemicals Division. Mixtures of these colorants also can be used. Dyes that are invisible to the naked eye but detectable when exposed to radiation outside the visible wavelength range (such as ultraviolet or infrared radiation), such as dansyl-lysine, N-(2-amino-ethyl)-4-amino-3,6-disulfo-1,8-dinaphthalimide dipotassium salt, N-(2-aminopentyl)-4-amino-3,6-disulf-o-1,8-dinaphthalimide dipotassium salt, Cascade Blue ethylenediamine trisodium salt (available from Molecular Proes, Inc.), Cascade Blue cadaverine trisodium salt (available from Molecular Proes, Inc.), bisdiazinyl derivatives of 4,4'-diaminostilbene-2,2'-disulfonic acid, amide derivatives of 4,4'-diamino-stilbene-2,2'-disulfonic acid, phenylurea derivatives of 4,4'-disubstituted stilbene-2,2'-disulfonic acid, mono- or di-naphthyltriazole derivatives of 4,4'-disubstituted stilbene disulfonic acid, derivatives of benzothiazole, derivatives of benzoxazole, derivatives of benzimidazole, derivatives of coumarin, derivatives of pyrazolines containing sulfonic acid groups, 4,4'-bis(triazin-2-ylamino) stilbene-2,2'-disulfonic acids, 2-(stilben-4-yl)naphthotriazoles, 2-(4-phenylstilben-4-yl)benzoxazoles, 4,4-bis(triazo-2-yl)stilbene-2,2'-disulfonic acids, 1,4-bis(styryl)-biphenyls, 1,3-diphenyl-2-pyrazolines, bis(benzazol-2-yl) derivatives, 3-phenyl-7-(triazin-2-yl)coumarins, carbostyrils, naphthalimides, 3,7-diamino-dibenzothiophen-2,8-disulfonic acid-5,5-dioxide, other commercially available materials, such as C.I. Fluorescent Brightener No. 28 (C.I. 40622), and the fluorescent series Leucophor B-302, BMB (C.I. 290), BCR, and BS (available from Leucophor) are also useful.

Examples of additional suitable dyes include, but are not limited to, anthraquinones; monoazo dyes; diazo dyes; phthalocyanines; aza[18]annulenes; formazan copper complexes, Bemacid Red (Berncolors, Poughkeepsie, N.Y.), Pontamine Brilliant Bond Blue, Berncolor A. Y. 34, Telon Fast Yellow 4GL-175, Basacid Black SE 0228 (BASF), the Pro-Jet series of dyes available from ICI, including Pro-Jet Yellow I (Direct Yellow 86), Pro-Jet Magenta I (Acid Red 249), Pro-Jet Cyan I (Direct Blue 199), Pro-Jet Black I (Direct Black 168), and Pro-Jet Yellow 1-G (Direct Yellow 132), Pro-Jet Fast Yellow, Cyan and Magenta (Zeneca Inc.), Aminyl Brilliant Red F-B (Sumitomo Chemical Co.), the Duasyn line of "salt-free" dyes available from Hoechst, such as Duasyn Direct Black HEF-SF (Direct Black 168), Duasyn Black RL-SF (Reactive Black 31), Duasyn Direct Yellow 60-SF VP216 (Direct Yellow 157), Duasyn Brilliant Yellow GL-SF VP220 (Reactive Yellow 37), Duasyn Acid Yellow XX-SF VP413 (Acid Yellow 23), Duasyn Brilliant Red F3B-SF VP218 (Reactive Red 180), Duasyn Rhodamine B-SF VP353 (Acid Red 52), Duasyn Direct Turquoise Blue FRL-SF VP368 (Direct Blue 199), and Duasyn Acid Blue AE-SF VP344 (Acid Blue 9), and mixtures thereof.

Examples of cationic dyes include the following from Crompton & Knowles Corp: Sevron Yellow L200 200%, Sevron Brilliant Red 4G 200%, Sevron Brilliant Red B 200%, Sevron Blue 2G, Sevron Black B1, Basic Black PSr, and Basic Black RX. Other cationic dyes can also be used in photocurable inks.

In addition, the colorant for the photocurable inks can be a pigment, or a mixture of one or more dyes, or one or more dyes and one or more pigments. The pigment can be black, cyan, magenta, yellow, red, blue, green, or brown pigments or mixtures thereof. Examples of suitable black pigments include various carbon blacks such as channel black, furnace black, and lamp black, such as Levanyl Black A-SF (Miles, Bayer) CAB-O-JET 200™ and CAB-O-JET 300™ (Cabot) and SUNSPERSE™ Carbon Black LHD 9303 (Sun Chemicals). Colored pigments include red, green, blue, brown, magenta, cyan, and yellow particles, as well as mixtures thereof. Illustrative examples of magenta pigments include 2,9-dimethyl-substituted quinacridone and anthraquinone, identified in the Color Index as CI 60710, CI Dispersed Red 15, and CI Solvent Red 19. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, and Special Blue X-2137. Illustrative examples of yellow pigments include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, and Permanent Yellow FGL. Additional examples of pigments include Normandy Magenta RD-2400 (Paul Uhlich), SUNSPERSE™ Quindo Magenta QHD 6040 (Sun Chemicals), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900 and L7020 (BASF), Heliogen Blue D6840 and D7080 (BASF), Sudan Blue OS (BASF), PV Fast Blue B2GO1 (American Hoechst), SUNSPERSE™ Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG 1 (Hoechst), Permanent Yellow YE 0305 (Paul Uhlich), Lumogen Yellow D0790 (BASF), SUNSPERSE™ Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF).

Additional suitable commercially available pigment dispersions include: HOSTAFINE™ pigments available from Celanese Corporation, including HOSTAFINE™ Black T, HOSTAFINE™ Black TS, HOSTAFINE™ Yellow HR, HOSTAFINE™ Yellow GR, HOSTAFINE™ Red FRLL, HOSTAFINE™ Rubine F6B, and HOSTAFINE™ Blue B2G; pigment dispersions available from Bayer AG including LEVANYL™ Yellow 5GXZ-SF; pigment dispersions available from Degussa Company including DERUSSOL™ carbon black pigment dispersions comprising DERUSSOL™ Z350S, DERUSSOL™ VU 25/L, DERUSSOL™ 345, and DERUSSOL™ (D 3450S; pigment dispersions available from BASF Corporation, including Disperse Black 006607, LUCONYL™ Yellow 1250, Basoflex Pink 4810, and LUCONYL™ Blue 7050; and pigment dispersions available from Sun Chemical Corporation including, SUNSPERSE™ Red RHD 9365 and SUNSPERSE™ Magenta W83012.

It is generally desired that pigment colorants used in the photocurable inks have a particle size as small as possible to enable a stable dispersion of the particles in the liquid vehicle and to prevent clogging of the ink channels or nozzle when the ink is used in an ink jet printer. For example, the particle average diameters are generally at least 0.001 µm and up to and including 0.3 µm, although particle sizes outside this range can be used. Generally, at least 70% of the pigment particles should have an average diameter of less than about 0.1 µm for carbon blacks and 0.3 µm for color pigments.

When dyes are used as colorants, the dyes are present in the photocurable ink in any effective amount and combinations needed to provide a desired color. For example, one or more dyes are present in an amount of at least 1 weight % and up to and including 15 weight % of the photocurable ink, and typically at least 2 weight % and up to and including 8 weight % (wherein the amount refers to an amount of dye molecules present in the photocurable ink), although the amounts can be outside these ranges. A mixture of dyes in the proportions desired to obtain a specific shade can also be used.

Similarly, when pigments are used, the pigments can be present in the photocurable inks in any effective amount. Generally, one or more pigments are present in an amount of at least 1 weight % and up to and including 10 weight % of the photocurable ink composition solids, and typically at least 2 weight % and up to and including 8 weight %, although the amounts can be outside of these ranges. When both dyes and pigments are incorporated into the photocurable inks, the weight percentage of the combined colorants can be adjusted accordingly.

Pigments can be dispersed in the photocurable inks using one or more dispersants that can be anionic, cationic, or nonionic. Ionic dispersants have both ionic (capable of ionization in water) and hydrophobic (affinity for pigments) moieties. Suitable nonionic dispersants include, but are not limited to, ethoxylated monoalkyl or dialkyl phenols including IGEPAL™ CA and CO series materials (Rhone-Poulenc Co.), TRITON® series materials (Union Carbide Company), and FLUORAD® FC430 (3M Corp.) materials. Such surfactants (when present) can be present in an amount of at least 0.1 weight % and up to and including 10 weight % of the total photocurable ink.

The weight ratio of pigment to pigment dispersant(s) in the photocurable ink can be at least 1:0.01 and up to and including 1:3, or typically at least 1:0.1 and up to and including 1:1. The photocurable ink should contain enough dispersant to stabilize the pigment particle dispersion, but not so much as to adversely affect properties of the photocurable ink viscosity, stability, and optical density.

In some embodiments, the photocurable inks are substantially free or totally free of organic solvents, meaning that they less than 10 weight %, or less than 5 weight % of organic solvent(s) based on the total weight of the photocurable ink.

The photocurable inks can also contain certain photocurable resins present that have a small enough particle size so as not to result in clogging of ink jet heads or nozzles. A smaller particle size is desired since this will reduce the chance of forming aggregates that could potentially plug the ink jet printing head or nozzle. Typical photocurable resins used in the photocurable inks have a mean particle size at least 30 nm and up to and including 80 nm. While photocurable resin with a mean particle size of at least 70 nm and up to and including 80 nm, or typically a mean particle size of at least 30 nm and up to and including 50 nm particularly if an ink cartridge is to be refilled and reused. Examples of suitable photocurable resins include, but are not limited to, urethane resins, acrylic resins, polyester resins, epoxy acrylate resins, and mixtures thereof, wherein the photocurable resins contain a sufficient level of unsaturation for example carbon-carbon double bonds groups to enable the resin to photopolymerize at a rate practical for the desired printing speed. The resins can be from any backbone, but an aliphatic backbone is currently preferred for uses where the final printed article must have the optimum durability. Typically, the unsaturation is obtained from acrylate or methacrylate functionality such as acrylate based monomers including polyfunctional alkoxylated acrylate monomers such as di- or tri-acrylates. However, alkoxylated or polyalkoxylated acrylic monomers of higher functionality can also be used alone or together with one or more di- or trifunctional materials. It is desired that the total amount of the polyfunctional material (alkoxylated+polyalkoxylated) is in the range at least 80% and up to and including 95% by weight of the photocurable ink. The number of alkoxy groups can be at least 1 and up to and including 20 per molecule of the monomer. The alkyleneoxy group can be a $C_2$-$C_4$ alkyleneoxy, such as ethoxy (EO) or propoxy (PO) groups. Suitable polyfunctional alkoxylated or polyalkoxylated acrylates can be selected from alkoxylated such as ethoxylated or propoxylated variants of neopentyl glycol diacrylates, butanediol diacrylates, trimethylpropane tri-acrylates and glyceryl triacrylate.

Optionally, photocurable inks can also contain some monofunctional alkoxylated or polyalkoxylated acrylated monomer material, for example up to 10% by weight of the total photocurable ink for example selected from one or more of alkoxylated (ethoxylated or propoxylated) variants of the following: tetrahydrofurfuryl acrylates, cyclohexyl acrylates, alkyl acrylates, nonyl-phenol acrylate and polyethylene or polypropylene glycol acrylates. The photocurable inks can also comprise minor amounts of non-alkoxylated radiation curable monomer material, either monofunctional or polyfunctional, such as up to no more than 5% by weight of the photocurable ink, for example selected from one or more of octyl acrylate, decyl acrylate, N-vinylpyrrolidone, ethyl diglycol acrylate, isobornyl acrylate, ethyl-hexyl acrylate, lauryl acrylate, butanediol monoacrylate, β-carboxyethyl acrylate, isobutyl acrylate, polypropylene glycol monomethacrylate, 2-hydroxyethyl methacrylate, difunctional (meth)acrylic acid esters, for example hexanediol di-(meth)acrylate, tetraethylene glycol diacrylate, tripropylene glycol diacrylate, butanediol diacrylate, polyethylene glycol diacrylates and triethylene glycol dimethacrylate.

Photocurable inks optionally comprise one or more minor ingredients, for example, surfactants, leveling additives, stabilizers, wetting agents, and pigment stabilizers that are known in the art. Pigment stabilizers can be for example polyester, polyurethane, or polyacrylate types, especially in the form of high molecular weight block co-polymers, and would typically be incorporated in an amount of at least 2.5% and up to and including 100% by weight of the pigment. Suitable examples are Disperbyk® 161 or 162 (BYK Chemie) or Solsperse® (Zeneca).

The amounts of the polymerizable monomer(s), photoinitiator, organic phosphine, and colorant (and optional photosensitizer) in the photocurable inks can vary according to the particular equipment and application.

The photocurable inks can also include one or more photosensitizers as described above, for example wherein the weight ratio of the N-oxyazinium salt photoinitiator to the photosensitizer is at least 1:1 and up to and including 100:1. Other details of the photocurable inks would be readily apparent to a skilled worker using the teaching provided in this disclosure.

These photocurable inks can be used in various methods. For example, a method of applying an ink comprises:
providing the photocurable ink described herein,
curing the photocurable ink by irradiating it with curing radiation, and
before or during curing, applying the photocurable ink to a substrate.

In some embodiments, the photocurable ink is only partially cured with the curing radiation before application to the substrate. This procedure can be used to modify the viscosity of the photocurable ink. In other embodiments, the photocurable ink is applied to the substrate before any curing. It is particularly advantageous that these methods can be carried out in the presence of oxygen.

Thus, in some embodiments, the photocurable ink comprises:
a colorant dispersed within a solvent,
an organic phosphine in the photocurable composition that is represented by Structure (I) or (II) described above,
an N-oxyazinium salt photoinitiator for example as represented above by Structure (III) or (IV), an aryl aldehyde or an alkyl aldehyde (for example, butyraldehyde, benzaldehyde, and others described above), a photosensitizer for the photoinitiator that is selected from the group consisting of ketocoumarins, benzophenones, xanthones, thioxanthones, arylketones, and polycyclic aromatic hydrocarbons, and a photocurable compound that is an acrylate.

Methods of Photocuring and Uses Thereof

A method is provided for generating free radicals to affect photocuring, especially in oxygen-containing environments. This method involves generating a free radical by exposing the described photoinitiator compositions to suitable actinic radiation. The exposure of the photoinitiator compositions to a radiation source triggers a photochemical process. As stated above, the term "quantum yield" is used herein to indicate the efficiency of a photochemical process.

The photoinitiator composition of the present invention absorbs photons of specific wavelength(s) and transfers the absorbed energy to one or more excitable portions of the composition. The excitable portion of the compositions absorbs enough energy to cause a bond breakage that generates one or more free radicals. The efficiency with which radicals are generated with the N-oxyazinium salt photoinitiators depends on quantum yield of the given photoinitiator. Thus, the N-oxyazinium salt photoinitiators can be employed in any situation where radicals are required, such as described above for photocuring or photopolymerization.

By way of illustration only, a photocurable composition (as described above) is prepared or provided and irradiated, for example, in the presence of oxygen, to cause photocuring or polymerization of various photocurable compounds within the composition and used for coatings, printable inks, paints, photoresists, or providing any image.

The photocurable composition can be used to polymerize or cure a photocurable compound by exposure to suitable radiation for a time and energy sufficient for efficacious photocuring. The photocurable compound can be mixed with the photoinitiator compositions of the present invention using any suitable mixing means known in the art, following which the mixture is irradiated with an amount of radiation. The amount of radiation sufficient to polymerize the compound is readily determinable by one of ordinary skill in the art, and depends upon the identity and amount of photoinitiator composition, the identity and amount of the photocurable compound, the intensity and wavelength of the radiation, and the duration of exposure to the radiation. In some instances, photocuring can occur during the mixing, or both during and after the mixing. For example, some photocurable compositions can be partially cured, treated in some manner, and then subjected to further curing.

The photoinitiating compositions can be used to prepare photocurable compositions by simply mixing, under "safe light" conditions, the photoinitiating composition, or individually, the N-oxyazinium salt photoinitiator, optionally a photosensitizer for the photoinitiator, an aryl aldehyde or an alkyl aldehyde, and an organic phosphine compound, with a suitable photocurable acrylate or other photocurable compound. This mixing can occur in suitable inert solvents if desired. Examples of suitable solvents include but are not limited to, acetone, methylene chloride, and any solvent that does not react appreciably with the phosphine, N-oxyazinium salt photoinitiator, photocurable compound, or photosensitizer.

A liquid organic material to be polymerized or photocured (such as an acrylate) can be used as the solvent for mixing, or it can be used in combination with another liquid. An inert solvent can be used also to aid in obtaining a solution of the materials and to provide suitable viscosity to the photocurable compositions for coatings, photocurable inks (described above), or other materials or operations. However, solvent-free photocurable compositions also can be prepared by simply dissolving the N-oxyazinium salt photoinitiator, the organic phosphine, aryl aldehyde or alkyl aldehyde, or photosensitizer in the organic photocurable material with or without mild heating.

A film can be prepared by forming a photocurable composition into a film and irradiating the film with an amount of radiation sufficient to polymerize or cure the composition. Any film thickness can be produced as long as the photocurable composition sufficiently polymerizes upon exposure to radiation. The photocurable composition can be drawn into a film on a nonwoven web or on a fiber, thereby providing a cured coating on a nonwoven web or fiber. Any method known in the art for drawing the photocurable composition into a film can be used. The amount of radiation sufficient to photocure the photocurable composition is readily determinable by one of ordinary skill in the art, and depends upon the identity and amount of photoinitiator, the identity and amount of the photocurable compound, the thickness of the admixture, the intensity and wavelength of the radiation, and the duration of exposure to the radiation.

Adhesive compositions can also be provided, which adhesive compositions comprise at least one unsaturated polymerizable or photocurable compounds admixed with photoinitiator composition. Similarly, the present invention can be used to provide a laminated structure comprising at least two layers bonded together with the described adhesive composition. In one embodiment, a laminate is produced wherein at least one layer is a cellulosic or polyolefin nonwoven web or film. Accordingly, a method of laminating a structure is also provided wherein a structure having at least two layers with the described adhesive composition between the layers is irradiated to polymerize or photocure the adhesive composition. It is to be understood that any substrate can be used in the laminates as long as at least one of the substrates allows sufficient radiation to penetrate through the layer to enable the admixture to polymerize to the desired extent. For example, such a layer can be transparent. Accordingly, any cellulosic or polyolefin nonwoven web or film known in the art can be used as one of the layers so long as they allow radiation to pass through. As described above, the amount of radiation sufficient to photocure the adhesive composition would be readily determinable by one of ordinary skill in the art, and depends upon the identity and amount of N-oxyazinium salt photoinitiator, the identity and amount of the photocurable compound, the thickness of the adhesive composition, the identity and thickness of the layer, the intensity and wavelength of the radiation, and the duration of exposure to the radiation.

Further, the present invention can be used to prepare an article that is obtained from a photocurable coating comprising a photocurable composition that comprises at least one N-oxyazinium salt photoinitiator, at least one organic phosphine, at least one aryl aldehyde or at least one alkyl aldehyde, and at least one photocurable compound. This photocurable coating can be disposed on a suitable substrate that is a coated or uncoated paper, metal, coated or uncoated polymeric film, ceramic, glass, or fabrics. For example, the photocurable composition can be disposed onto a substrate as a varnish coating that is this irradiated in a suitable manner. The photocurable coating can also be cured in an imagewise pattern or uniformly.

The photocurable coating can be disposed on the substrate uniformly or in a pattern. For example, the photocurable coating of this invention can be disposed on, or alternatively applied to, the substrate in an imagewise pattern using an imagewise patterning or imaging method including the use of a mask. Such articles include but are not limited to, printed circuit board precursors in which a photocured image or pattern to provide a printed circuit board.

Other articles can be formed from a photocurable composition as a coating, component, or pattern. Thus, a photocurable composition is provided in the article, and the photocurable composition is suitably irradiated to cure it, partially or uniformly. This article can include a substrate on which the photocurable composition is disposed, or the article can include the photocurable composition as the substrate itself. The irradiation of the article, or to form the article, is particularly advantageous if carried out in the presence of oxygen.

As noted above, the photoinitiator composition of this invention can be used in a method of photocuring a photocurable composition comprising:

mixing at least one N-oxyazinium salt photoinitiator, at least one organic phosphine, at least one aryl aldehyde or at least one alkyl aldehyde, and at least one photocurable compound, to form a photocurable composition, and irradiating the photocurable composition to provide a photocured composition. The irradiating step is advantageously carried out in the presence of oxygen.

In some methods, the photocurable composition is partially cured during the irradiating step to provide a partially cured composition. For example, the photocurable composition (such as a photocurable ink described above) can be jetted out of a nozzle before partial curing from the irradiating step to modify the viscosity of the photocurable composition. This process can also comprise a step of further curing the partially cured photocurable composition.

The irradiating step is carried out using curing radiation having a wavelength of at least 100 nm and up to and including 1250 nm, and particularly at a wavelength of at least 100 nm and up to and including 1000 nm. The photocuring radiation can be ultraviolet radiation, including near ultraviolet and far or vacuum ultraviolet radiation, visible radiation, and near infrared radiation. Desirably, the radiation will have a wavelength of at least 100 nm and up to and including 900 nm, or typically at least 100 nm and up to and including 700 nm. Useful ultraviolet radiation has a wavelength of from at least 100 nm and up to and including 400 nm. The radiation desirably will be incoherent, pulsed ultraviolet radiation from a dielectric barrier discharge excimer lamp or radiation from a mercury lamp. Other sources of radiation can be used.

In many embodiments, the photocurable composition is dissolved or dispersed in a solvent before the irradiating step. Alternatively, the photocurable composition is mixed as a solution with at least one photocurable compound acting as the solvent. In either of these embodiments, the photocurable compound can be a photocurable acrylate.

Thus, the method can further comprise applying the photocurable composition to a substrate before the irradiating step. Alternatively, the method includes putting the photocurable composition into a mold before the irradiating step.

In these methods, the photocurable composition comprises the N-oxyazinium salt photoinitiator (described above) in an amount of at least $6 \times 10^{-7}$ moles per gram and up to and including $6 \times 10^{-2}$ moles per gram of one or more photocurable compounds (described above, such as acrylates). Moreover, the photocurable composition can further include a photosensitizer (described above) that is present in an amount of at least $5 \times 10^{-7}$ mole per gram and up to and including $1 \times 10^{-4}$ moles per gram of the one or more photocurable compounds. The photocurable composition used in this method can comprise the organic phosphine and an aryl aldehyde or alkyl aldehyde in amounts described above. The one or more photocurable compounds can include a photocurable monomeric, oligomeric, or polymeric acrylate. In some embodiments, the one or more photocurable compounds comprise a photocurable acrylate that comprises a photosensitizer for the N-oxyazinium salt photoinitiator.

The photoinitiator composition of this invention can be used in a method of imaging comprising:

A) providing a photocurable composition comprising at least one N-oxyazinium salt photoinitiator (described above), at least one organic phosphine (described above), at least one aryl aldehyde or at least one alkyl aldehyde, and at least one photocurable compound (described above, such as an acrylate), to form a photocurable composition, and B) imagewise irradiating the photocurable composition to affect a cured image.

The photocurable composition can be applied to a substrate prior to the imagewise irradiating step. Moreover, the imagewise irradiating step can be carried out by irradiating the photocurable composition through a mask image.

The photocurable composition can be applied to a substrate (described above) during the imagewise irradiating step. For example, the photocurable composition can be applied to a metal substrate for use in providing a printed circuit board or photoresist. If desired, the photocurable composition further comprises a photosensitizer (described above) for the N-oxyazinium salt photoinitiator. Moreover, imagewise irradiating the photocurable composition can be carried out in a pattern and the non-cured portions of the photocurable composition can be removed by development. Useful developers would be readily apparent to a skilled worker and dependent upon the photocurable compound that is used. It is particularly advantageous to carry out imagewise irradiating in the presence of oxygen.

The photoinitiator composition can be included as part of kit that also includes a precursor composition comprising one or more photocurable compounds such as photocurable acrylates. In such kits, each component is separately packaged until it is needed, and each component can be in solid form, or the precursor composition can be in liquid form and the photoinitiating composition can be in solid form.

For example a kit of this invention comprises:

a) a precursor composition comprising one or more photocurable acrylates as described herein, and b) a photoinitiator composition as described herein comprising at least one N-oxyazinium salt photoinitiator, at least one photosensitizer for the N-oxyazinium salt photoinitiator, at least one aryl aldehyde or alkyl aldehyde, and at least one organic phosphine that together form N-oxyazinium salt efficiency amplifier composition.

In this kit, the weight ratio of the organic phosphine to the N-oxyazinium salt photoinitiator can be at least 0.01:1 and up to and including 100:1. The precursor composition can be in liquid form and the photoinitiator composition can be in solid form. Alternatively, both precursor composition and photoinitiator composition can be in solid form.

Evaluation of useful photoinitiator compositions as initiating systems for photopolymerization or photocuring can be carried out using an acrylate-based coating formulation (see Examples below). Irradiation to initiate photocuring can be carried out using a filtered mercury lamp output with or without band-pass filters. This is just one source of useful curing radiation. The efficiency of photopolymerization can be determined by the amount of photocured polymer retained after solvent development, which leaves behind only the areas that had sufficient exposure to cause crosslinking of the photocurable acrylates. Thus, a more efficient photoinitiator composition can create more crosslinked polymer than a less efficient photoinitiator composition.

The present invention is further described by the examples which follow. Such examples, however, are not to be construed as limiting in any way either the spirit or the scope of the present invention. In the examples, all parts are by weight, unless stated otherwise.

The following Examples are provided as an illustration of the practice of this invention. These Examples show the effect of the added photoinitiator efficiency amplifier, that is a phosphine in most embodiments of the present invention, on the overall quantum yield of decomposition of N-oxyazinium salt via photoinduced electron transfer from a photosensitizer.

Control 1:

Quantum yield of 2-chlorothioxanthone (S-2) photosensitized reaction of N-methoxy-4-phenylpyridinium hexafluorophosphate (OZ-1) in acetonitrile-$d_3$:

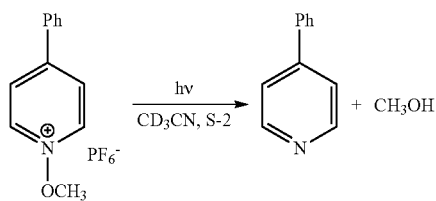

The 2-chlorothioxanthone(S-2) (0.002 mol) sensitizer was added to a 3 ml solution of 0.02 molar N-methoxy-4-phenylpyridinium hexafluorophosphate (OZ-1) in acetonitrile-$d_3$. In a 1×1 cm quartz cell, this solution was purged with a thin stream of argon for 2-3 minutes and then irradiated at 405 nm for 5 minutes. Argon or nitrogen was continuously passed through the reaction mixture during photolysis to purge as well as stir the solution. After photolysis, a $^1$H NMR spectrum of the photolysate was recorded and the percent conversion of the starting materials was determined by integration of diagnostic signals. For example, before photolysis the $^1$H NMR spectrum of a solution of N-methoxy-4-phenylpyridinium hexafluorophosphate and a catalytic amount of 2-chlorothioxanthone in acetonitrile-$d_3$ shows characteristic signals due to the N-methoxypyridinium salt OZ-1 [δ: 8.94 (m, 2H), 8.35 (m, 2H), 7.94 (m, 2H), 7.69 (m, 3H), and 4.43 (s, 3H)]. After irradiation at 405 nm for about 2 minutes, the $^1$H NMR spectrum of the photolysate clearly showed appearance of new diagnostic signals due to formation of 4-phenylpyridine [δ: 8.71 (m, 2H) and 8.26 (m, 2H) and CH$_3$OH (δ: 3.30)]. The identity of these products was established by comparison with $^1$H NMR spectra of authentic samples. The yields of the photo-products were determined from quantitative integration of diagnostic signals of starting materials, N-methoxy-4-phenylpyridinium (OZ-1), and product, 4-phenylpyridine, in $^1$H NMR spectra of the reaction mixtures. Conversions were kept between 15-20% to minimize any secondary photolysis of the products. The photon flux at the excitation wavelengths, 405 nm, was determined by using the known photocycloaddition reaction of phenanthrenequinone to trans-stilbene in benzene as an actinometer (Bohning, J. J.; Weiss, K. J. Am. Chem. Soc. 1966, 88, 2893.). The light intensity was within 7-10×10$^{-8}$ Einsteins min$^{-1}$. The quantum yield of reaction was determined by dividing the moles of photoproduct formed by total light intensity and is shown below in TABLE IV.

Comparative Example 1

Amplified quantum yield of 2-chlorothioxanthone (S-2) photosensitized reaction of N-methoxy-4-phenylpyridinium hexafluorophosphate (OZ-1) and triphenylphosphine in acetonitrile-$d_3$:

The 2-chlorothioxanthone (S-2) (0.002 mol) sensitizer was added to a 3 ml solution of 0.02 molar N-methoxy-4-phenylpyridinium hexafluoro-phosphate (OZ-1) and 0.001 molar triphenylphosphine in acetonitrile-$d_3$. In a 1×1 cm quartz cell, this solution was purged with a thin stream of argon for 2-3 minutes and then irradiated at 405 nm for 30 seconds. Argon or nitrogen was continuously passed through the reaction mixture during photolysis to purge as well as stir the solution. After photolysis, $^1$H NMR spectrum of the photolysate was recorded and the percent conversion of the starting materials was determined by integration of diagnostic signals. Before photolysis, the $^1$H NMR spectrum of an solution of OZ-1, triphenylphosphine and a catalytic amount of 2-chlorothioxanthone in acetonitrile-$d_3$ shows characteristic signals due to the N-methoxy-4-phenylpyridinium salt (δ: 8.94 (m, 2H), 8.35 (m, 2H), 7.94 (m, 2H), 7.69 (m, 3H), and 4.43 (s, 3H)), triphenylphosphine ((δ: 7.40 (m, 9H), 7.32 (m, 6H)). After irradiation at 405 nm for about 30 seconds, the $^1$H NMR spectrum of the photolysate clearly showed appearance of new diagnostic signals due to formation of 4-phenylpyridine (δ: 8.71 (m, 2H) and 8.26 (m, 2H)) and methoxy-triphenylphosphine (δ: 4.04 (quintet (J=12 Hz) 3H)). The identity of these products was established by comparison with $^1$H NMR spectra of authentic samples. The yields of the photoproducts were determined from quantitative integration of $^1$H NMR spectra of the reaction mixtures containing products methoxytriphenylphosphonium signal at δ: 4.04 relative to starting material N-methoxy signal of OZ-1 at δ: 4.43. Conversions were kept between 15-25% to minimize any secondary photolysis of the products. The photon flux at the excitation wavelengths, 405 nm, was determined by using the known photocycloaddition reaction of phenanthrenequinone to trans-stilbene in benzene as an actinometer (Bohning, J. J.; Weiss, K. J. Am. Chem. Soc. 1966, 88, 2893.). The light intensity was within 7-10×10$^{-8}$ Einsteins min$^{-1}$. The quantum yield of reaction was determined by dividing the moles of photoproducts formed by total light intensity and is shown below in TABLE IV.

Invention Example 1

Effect of Aldehyde on Quantum Efficiency

Amplified quantum yield of 2-chlorothioxanthone (S-2) photosensitized reaction of N-methoxy-4-phenylpyridinium hexafluorophosphate (OZ-1) and triphenylphosphine in acetonitrile-$d_3$:

The 2-chlorothioxanthone (S-2) (0.002 mol) photosensitizer was added to a 3 ml solution of 0.02 molar N-methoxy-4-phenylpyridinium hexafluoro-phosphate (OZ-1), 0.001 molar triphenylphosphine, and 0.0001 molar butraldehyde in acetonitrile-$d_3$. In a 1×1 cm quartz cell, this solution was purged with a thin stream of argon for 2-3 minutes and then irradiated at 405 nm for 30 seconds. Argon or nitrogen was continuously passed through the reaction mixture during photolysis to purge as well as stir the solution. After photolysis, $^1$H NMR spectrum of the photolysate was recorded and the percent conversion of the starting materials was determined by integration of diagnostic signals as described in Example 1. The quantum yield of reaction was determined by dividing the moles of photoproducts formed by total light intensity and is shown below in TABLE IV.

Invention Example 2

Effect of Aldehyde on Quantum Efficiency

Amplified quantum yield of 2-chlorothioxanthone (S-2) photosensitized reaction of N-methoxy-4-phenylpyridinium hexafluorophosphate (OZ-1) and triphenylphosphine in acetonitrile-d$_3$:

The 2-chlorothioxanthone (S-2) (0.002 mol) sensitizer was added to a 3 ml solution of 0.02 molar N-methoxy-4-phenylpyridinium hexafluoro-phosphate (OZ-1), 0.001 molar triphenylphosphine, and 0.001 molar butraldehyde in acetonitrile-d$_3$. In a 1×1 cm quartz cell, this solution was purged with a thin stream of argon for 2-3 minutes and then irradiated at 405 nm for 30 seconds. Argon or nitrogen was continuously passed through the reaction mixture during photolysis to purge as well as stir the solution. After photolysis, $^1$H NMR spectrum of the photolysate was recorded and the percent conversion of the starting materials was determined by integration of diagnostic signals as described in Example 1. The quantum yield of reaction was determined by dividing the moles of photoproducts formed by total light intensity and is shown below in TABLE IV.

Comparative Example 2

Amplified quantum yield of 2-chlorothioxanthone (S-2) photosensitized reaction of N-methoxy-4-phenylpyridinium hexafluorophosphate (OZ-1) and triphenylphosphine in acetonitrile-d$_3$:

This example shows effect of the concentration of the N-oxyazinium salt OZ-1 on the quantum yield. The 2-chlorothioxanthone (S-2) (0.002 mol) photosensitizer was added to a 3 ml solution of 0.04 molar N-methoxy-4-phenylpyridinium hexafluorophosphate (OZ-1), 0.01 molar triphenylphosphine in acetonitrile-d$_3$. In a 1×1 cm quartz cell, this solution was purged with a thin stream of argon for 2-3 minutes and was then irradiated at 405 nm for 10-30 seconds minutes. Argon or nitrogen was continuously passed through the reaction mixture during photolysis to purge as well as stir the solution. After photolysis, $^1$H NMR spectrum of the photolysate was recorded and the percent conversion of the starting materials was determined by integration of diagnostic signals as described above. The quantum yield of reaction was determined by dividing the moles of photoproducts formed by total light intensity and is shown below in TABLE IV.

Invention Example 3

Amplified quantum yield of 2-chlorothioxanthone (S-2) photosensitized reaction of N-methoxy-4-phenylpyridinium hexafluorophosphate (OZ-1) and triphenylphosphine in acetonitrile-d$_3$:

This example shows effect of the concentration of the N-oxyazinium salt OZ-1 on the quantum yield. The 2-chlorothioxanthone (S-2) (0.002 mol) photosensitizer was added to a 3 ml solution of 0.04 molar N-methoxy-4-phenylpyridinium hexafluorophosphate (OZ-1), 0.01 molar triphenylphosphine, and 0.001 molar benzaldehyde in acetonitrile-d$_3$. In a 1×1 cm quartz cell, this solution was purged with a thin stream of argon for 2-3 minutes and was then irradiated at 405 nm for 10-30 seconds minutes. Argon or nitrogen was continuously passed through the reaction mixture during photolysis to purge as well as stir the solution. After photolysis, $^1$H NMR spectrum of the photolysate was recorded and the percent conversion of the starting materials was determined by integration of diagnostic signals as described above. The quantum yield of reaction was determined by dividing the moles of photoproducts formed by total light intensity and is shown below in TABLE IV.

TABLE IV

Reaction of Triplet Sensitized Reaction of N-Oxyazinium Salts with and without Tiphenylphosphine: Effect of Concentration of N-Oxyazinium on Quantum Yields.

|  |  | Amount of Triphenylphosphine | Amount of Aldehyde | Quantum Yield |
| --- | --- | --- | --- | --- |
| Control 1 | 0.002 molar S-2 + 0.02 molar OZ-1 | 0 | 0 | 0.95 |
| Comparative Example 1 | 0.002 molar S-2 + 0.02 molar OZ-1 | 0.001 molar | 0 | 52.0 |
| Invention Example 1 | 0.002 molar S-2 + 0.02 molar OZ-1 | 0.001 molar | 0.0001 molar butraldehyde | 64.0 |
| Invention Example 2 | 0.002 molar S-2 + 0.02 molar OZ-1 | 0.001 molar | 0.001 molar butraldehyde | 101.0 |
| Comparative Example 2 | 0.002 molar S-2 + 0.04 molar OZ-1 | 0.01 molar | 0 | 220.0 |
| Invention Example 3 | 0.002 molar S-2 + 0.04 molar OZ-1 | 0.01 molar | 0.001 molar benzaldehyde | 460.0 |

The data in TABLE IV clearly show that the quantum yields of reaction of N-oxyazinium salt OZ-1, by photoinduced electron transfer from S-2, are greatly amplified in the presence of the added triphenylphosphine-aldehyde composition relative to Control 1 and Example 1. The improvement is shown to be greatest with the use of an aryl aldehyde (Invention Example 3).

The unexpected curing speed produced by the photoinitiator compositions of the present invention is best understood by comparing their performance, when used with an efficiency amplifier phosphine, to their performance when used without one. A series of photocurable polymerizable mixtures containing invention photoinitiator compositions were formulated and compared with photocurable mixtures containing only N-oxyazinium salt and photo sensitizer. Photocurable polymerizable mixtures were formulated as described below in Control 2 and Example 3 and Invention Example 4.

The following Examples demonstrate the cure efficiency of photoinitiator composition according to this present invention for photocuring an acrylate-containing composition in air.

Control 2:

To a mixture of multifunctional acrylates (10 g, 8:2 by weight mixture of polyethylene glycol 200 diacrylate (SR259) and dipentaerythritol pentaacrylate ester (SR399) (both from Sartomer), 2-chlorothioxanthone photosensitizer S-2 (14.2 mg, $5.7 \times 10^{-5}$ mol), and 4-phenyl-N-methoxypyridinium hexafluorophosphate N-oxyazinium salt OZ-1 (40.5 mg, $1.2 \times 10^{-4}$ mol) were added and dissolved at room temperature. Each formulation was then coated onto a glass plate and exposed to 405 nm radiation in air. After this irradiation, the samples were washed with acetone and the cure efficiency was measured in terms of the amount of crosslinked polymer left. The results are summarized in TABLE V below.

Comparative Example 3

To a mixture of multifunctional acrylates (10 g, 8:2 by weight mixture of polyethylene glycol 200 diacrylate (SR259) and dipentaerythritol pentaacrylate ester (SR399) (both from Sartomer), 2-chlorothioxanthone photosensitizer S-2 (12.2 mg, $5.7 \times 10^{-5}$ mol), and 4-phenyl-N-methoxypyridinium hexafluorophosphate N-oxyazinium salt OZ-1 (40.5 mg, $1.2 \times 10^{-4}$ mol) were added and dissolved at room temperature. The mixture was split in three equal parts. In one part, triphenylphosphine efficiency amplifier (63 mg, $7.7 \times 10^{-4}$ mol) was added and in another part triphenylphosphine efficiency amplifier (63 mg, $7.7 \times 10^{-4}$ mol) and benzaldehyde (81 mg, $7.7 \times 10^{-4}$ mol) were added. The formulations were then coated onto a glass plate and exposed to 405 nm radiation in air. After irradiation, the samples were washed with acetone and the cure efficiency measured in terms of the amount of crosslinked polymer left. The results are summarized below in TABLE V.

TABLE V

Effect of Triphenylphosphine on Photocuring in Air

| | Degree of Curing | Material left after Solvent Wash? |
|---|---|---|
| Control 2 | No | None |
| Comparative Example 3 with phosphine | Extensive curing | Some |
| Invention Example 4 with phosphine and aldehyde | Extensive curing | Substantial |

These results clearly show that in the presence of the efficiency amplifier phosphine and aldehyde, photocuring of the polymerizable composition was quite extensive compared to Example 3 without any aldehyde or to Control 2.

The following Control 3 and Example 4 compare the photocuring speed of a photoinitiator composition containing an efficiency amplifier organic phosphine-aldehyde with a composition containing phosphine only and aldehyde efficiency amplifier.

Control 3:

To a mixture of multifunctional acrylates (10 g, 8:2 by weight mixture of polyethylene glycol 200 diacrylate (SR259) and dipentaerythritol pentaacrylate ester (SR399) (both from Sartomer), 2-chlorothioxanthone photosensitizer S-2 (12.2 mg, $5.7 \times 10^{-5}$ mol), and 4-phenyl-N-methoxypyridinium hexafluorophosphate N-oxyazinium salt OZ-1 (40.5 mg, $1.2 \times 10^{-4}$ mol) were added and dissolved at room temperature. The formulation was then coated onto a glass plate and exposed to 405 nm radiation under nitrogen. After irradiation, the sample was washed with acetone and cure efficiency measured in terms of the amount of crosslinked polymer left. The results are summarized in TABLE VI.

Comparative Example 4

To a mixture of multifunctional acrylates (10 g, 8:2 by weight mixture of polyethylene glycol 200 diacrylate (SR259) and dipentaerythritol pentaacrylate ester (SR399) (both from Sartomer), 2-chlorothioxanthone photosensitizer S-2 (12.2 mg, $5.7 \times 10^{-5}$ mol), and 4-phenyl-N-methoxypyridinium hexafluorophosphate N-oxyazinium salt OZ-1 (40.5 mg, $1.2 \times 10^{-4}$ mol) were added and dissolved at room temperature and triphenylphosphine efficiency amplifier (500 mg, 0.002 moles) was added to the formulation. The formulation was split in two portions and in one portion benzaldehyde (200 mg, 0.002 moles) was added (Invention Example 5). Each formulations was then coated onto a glass plate and exposed to 405 nm radiation under $N_2$. After irradiation, each sample was washed with acetone and the cure efficiency was measured in terms of the amount of crosslinked polymer left. The results are summarized below in TABLE VI.

TABLE VI

Effect of Efficiency Amplifier Triphenylphosphine on Cure Speed

| Photoinitiator Composition | Dose Required for Complete Photocuring |
|---|---|
| Control 3 OZ-1 + S-2 | 120 mJ/cm$^2$ |
| Comparative Example 4 OZ-1 + S-2 + Triphenylphosphine | 5 mJ/cm$^2$ |
| Invention Example 5 OZ-1 + S-2 + Triphenylphosphine + Benzaldehyde | 0.5 mJ/cm$^2$ |

These results clearly show that in the use of an aldehyde with phosphine efficiency amplifier provided quite rapid photocuring of the polymerizable composition (by a factor of 10) relative to the photoinitiator composition without added aldehyde or phosphine as in Control 3.

The invention has been described in detail with particular reference to certain preferred embodiments thereof, but it will be understood that variations and modifications can be effected within the spirit and scope of the invention.

The invention claimed is:

1. A photoinitiator composition comprising at least one N-oxyazinium salt photoinitiator, an aryl aldehyde or alkyl aldehyde each having a molecular weight of less than 1000, at least one organic phosphine as an N-oxyazinium salt efficiency amplifier, and a solvent that does not react with the N-oxyazinium salt photoinitiator, aryl aldehyde or alkyl aldehyde, or organic phosphine,
   wherein:
   (i) each of the aryl aldehydes or alkyl aldehydes has one aldehyde moiety and is represented by the structure R"—CHO wherein R" is a substituted or unsubstituted alkyl or substituted or unsubstituted aryl group, or (ii) the alkyl aldehyde comprises an oligomeric or polymeric backbone having multiple —(CH$_2$CH(CHO))— groups along the oligomeric or polymeric backbone,
   the N-oxyazinium salt photoinitiator is present in the photoinitiator composition in an amount of at least 2 weight % and up to and including 90 weight %, based on total composition solids, the organic phosphine is present at a weight ratio to the N-oxyazinium salt photoinitiator of at least 0.5:1 and up to and including 50:1, the molar ratio of the organic phosphine to aldehyde moieties in the aryl aldehyde or alkyl aldehyde is at least 1:1 and up to and including 4:1, and the N-oxyazinium salt photoinitiator is represented by either of the following Structures (III) and (IV):

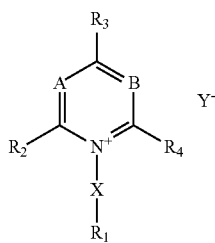
(III)

wherein in Structure (III), A and B independently represent a carbon, C—$R_5$, C—$R_6$ or nitrogen, X is O, $R_1$, $R_2$, $R_3$, $R_4$, $R_5$, and $R_6$ are independently hydrogen, substituted or unsubstituted alkyl groups having 1 to 12 carbon atoms, or substituted or unsubstituted aryl groups having 6 or 10 carbon atoms in the carbocyclic ring, any of the A, B, and R groups where chemically feasible can be joined together to form a ring, and $Y^-$ is a charge balancing anion that can be a separate moiety or a charged part of an A, B, or R group,

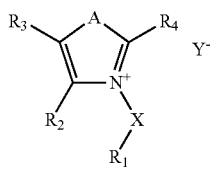
(IV)

wherein in Structure (IV), A represents a carbon, C—$R_5$, nitrogen, sulfur or oxygen atom with sufficient bonds and substituents to form a heteroaromatic ring, X is O, $R_1$, $R_2$, $R_3$, $R_4$, and $R_5$ are independently hydrogen, or alkyl or aryl groups, or any two R groups together can form a ring, and $Y^-$ is a charge balancing anion that can be a separate moiety or part of a charged R group.

2. The composition of claim 1 wherein the organic phosphine is represented by the following Structure (I) or (II):

$(R')_3P$ (I)

$(R')_2P-L-P(R')_2$ (II)

wherein the multiple R' groups are:
(1) hydrogen,
(2) the same or different substituted or unsubstituted alkyl groups,
(3) the same or different substituted or unsubstituted cycloalkyl groups,
(4) the same or different substituted or unsubstituted aryl groups,
(5) the same or different HO[{CH(R)}$_x$]$_y$ groups wherein the multiple R groups are the same or different and can be hydrogen atoms or substituted or unsubstituted alkyl or cycloalkyl groups, or two R' groups together can form a cyclic aliphatic ring or fused ring system, x is an integer of at least 2 and up to and including 20, and y is an integer of at least 1 and up to and including 20, or
(6) two adjacent R' groups are joined together to form a cyclic ring with the phosphorus atom, provided at least one R' group is not hydrogen, and L is a connecting group having at least 1 to 12 carbon atoms in the linking chain.

3. The composition of claim 1 comprising one or more of methyl phosphine, dimethyl phosphine, trimethyl phosphine, triethyl phosphine, tripropyl phosphine, tri-n-butyl phosphine, triisobutyl phosphine, triamyl phosphine, trihexyl phosphine, trinonyl phosphine, tri-(ethylene glycol) phosphine, tri-(propylene glycol) phosphine, tri(isopropylene glycol) phosphine, tri(butylene glycol) phosphine, tri (isobutylene glycol) phosphine, tri(pentylene glycol) phosphine, tri(hexylene glycol) phosphine, tri(nonylene glycol) phosphine, tri(diethylene glycol) phosphine, tri(triethylene glycol) phosphine, tri(polyethylene glycol) phosphine, tri (polypropylene glycol) phosphine, di(ethylamino)phenylphosphine, triphenylphosphine, tritolylphosphine, tris(4-methoxyphenyl)phosphine, tri(polybutylene glycol) phosphine, bis(diphenylphosphinoethyl)phenylphosphine, bis(diphenylphosphino)methane, 1,2-bis(diphenylphosphino)ethane, 1,5-bis(dicyclohexylphosphino)pentane, 1,4-bis(dicyclohexylphosphino)butane, 1,2-bis(dicyclohexylphosphino)ethane, bis(dicyclohexylphosphino)methane, bis (diphenylphosphino)methane monoxide, and the compound represented by the following structure:

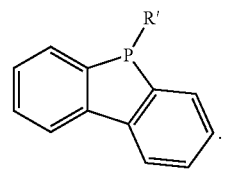

4. The composition of claim 1 wherein the N-oxyazinium salt photoinitiator has a cation represented by one of the following formulae:

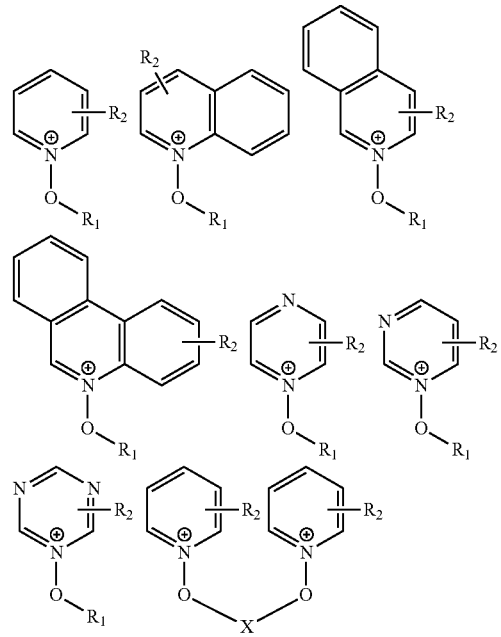

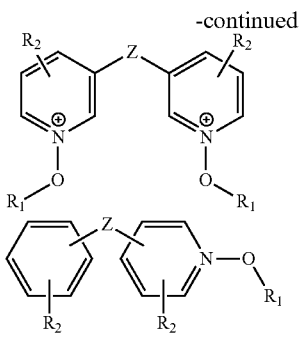

wherein R₁ represents a substituted or unsubstituted alkyl group, substituted or unsubstituted aryl group, or an acyl group, wherein R₁ can also include a charge balancing anion, the R₂ groups independently represent hydrogen, or a substituted or unsubstituted alkyl, substituted or unsubstituted aryl, substituted or unsubstituted alkoxy, substituted or unsubstituted heteroaryl group, or nitrite group, X is a divalent linking group, and Z is an aliphatic linking group.

5. The composition of claim 1 wherein the N-oxyazinium salt photoinitiator has a reduction potential less negative than −1.4 V and comprises an N-oxy group that is capable of releasing an oxy radical during irradiation of the photocurable composition.

6. The composition of claim 1, wherein the organic phosphine is present in a molar amount relative to total aldehyde moieties of at least 1:1 and up to and including 3:1.

7. The composition of claim 1 further comprising a photosensitizer for the N-oxyazinium salt photoinitiator that is selected from the group consisting of ketocoumarins, benzophenones, xanthones, thioxanthones, arylketones, and polycyclic aromatic hydrocarbons.

8. The composition of claim 1 wherein the aryl aldehyde or alkyl aldehyde has a molecular weight of less than 500.

9. The composition of claim 1 that is a photocurable composition further comprising at least one photocurable compound and the organic phosphine is present in an amount of at least 0.5 weight % and up to and including 20 weight %, and the N-oxyazinium salt photoinitiator is present in an amount of at least 0.1 weight % and up to and including 20 weight %, both based on the total weight of the photoinitiator composition.

10. The composition of claim 9 comprising at least one acrylate as a photocurable compound.

11. The composition of claim 9 wherein the organic phosphine is represented by the following Structure (I) or (II):

(R')₃P    (I)

(R')₂P-L-P(R')₂    (II)

wherein the multiple R' groups are:
(1) hydrogen,
(2) the same or different substituted or unsubstituted alkyl groups,
(3) the same or different substituted or unsubstituted cycloalkyl groups,
(4) the same or different substituted or unsubstituted aryl groups,
(5) the same or different HO[{CH(R)}ₓ]ᵧ groups wherein the multiple R groups are the same or different and can be hydrogen atoms or substituted or unsubstituted alkyl or cycloalkyl groups, or two R' groups together can form a cyclic aliphatic ring or fused ring system, x is an integer of at least 2 and up to and including 20, and y is an integer of at least 1 and up to and including 20, or
(6) two adjacent R' groups are joined together to form a cyclic ring with the phosphorus atom, provided at least one R' group is not hydrogen, and L is a connecting group having at least 1 to 12 carbon atoms in the linking chain.

12. The composition of claim 9 wherein the N-oxyazinium salt photoinitiator has a cation represented by one of the following formulae:

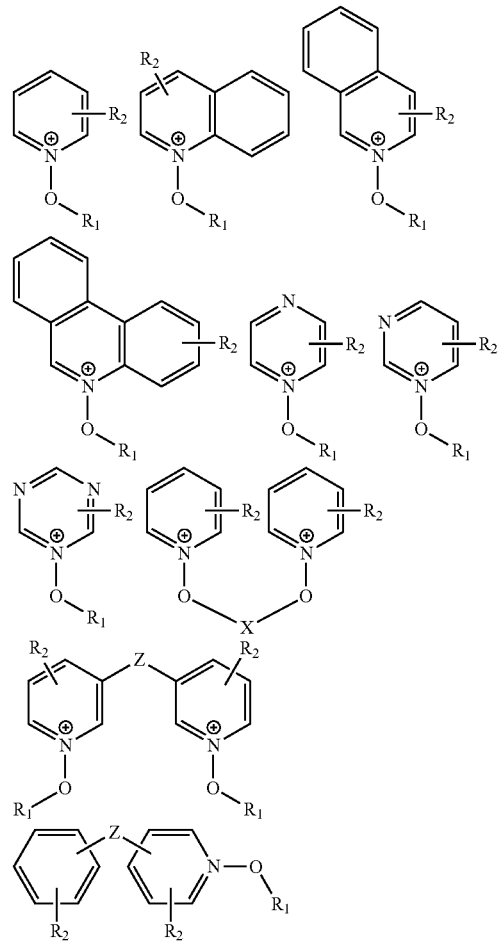

wherein R₁ represents a substituted or unsubstituted alkyl group, substituted or unsubstituted aryl group, or an acyl group, wherein R₁ can also include a charge balancing anion, the R₂ groups independently represent hydrogen, or a substituted or unsubstituted alkyl, aryl, alkoxy, or heteroaryl group, or a nitrile group, X is a divalent linking group, and Z is an aliphatic linking group.

13. The composition of claim 9 wherein the N-oxyazinium salt photoinitiator has a reduction potential less negative than −1.4 V and comprises an N-oxy group that is capable of releasing an oxy radical during irradiation of the photocurable composition.

14. The composition of claim 9 further comprising a photo sensitizer for the N-oxyazinium salt photoinitiator that is selected from the group consisting of ketocoumarins, benzophenones, xanthones, thioxanthones, arylketones, and polycyclic aromatic hydrocarbons.

15. The composition of claim 1 further comprising a non-reactive organic solvent.

16. The composition of claim 9 that is a photocurable ink that further comprises a colorant.

17. A kit comprising:
   a) a precursor composition comprising one or more photocurable acrylates, and
   b) the photoinitiator composition of claim 1.

18. The photoinitiator composition of claim 1, wherein the alkyl aldehyde is one or more of acetaldehyde, propionaldehyde, butyraldehyde, 2-methylbutyraldehyde, cyclohexanecarboxaldehyde, and cyclopentanecarboxaldehyde, and the aryl aldehyde is one or more of 4-methoxybenzaldehyde, 4-methylbenzaldehyde, terephthaldehyde, 2,5-dimethoxy-1,4-benzenedicarboxaldehyde, and naphthalene-1,4-dicarboxaldehyde.

19. The photoinitiator composition of claim 1, wherein the alkyl aldehyde is one or more of acetaldehyde, propionaldehyde, butyraldehyde, 2-methylbutyraldehyde, cyclohexanecarboxaldehyde, and cyclopentanecarboxaldehyde, and the aryl aldehyde is one or more of substituted or unsubstituted benzaldehydes and substituted or unsubstituted naphthaldehydes.

20. The composition of claim 9, wherein the photocurable compound acts as the sole organic solvent.

* * * * *